Feb. 12, 1929.
H. L. JOHNSON
1,701,778
CLEANING SIEVE
Filed April 8, 1926
4 Sheets-Sheet 1
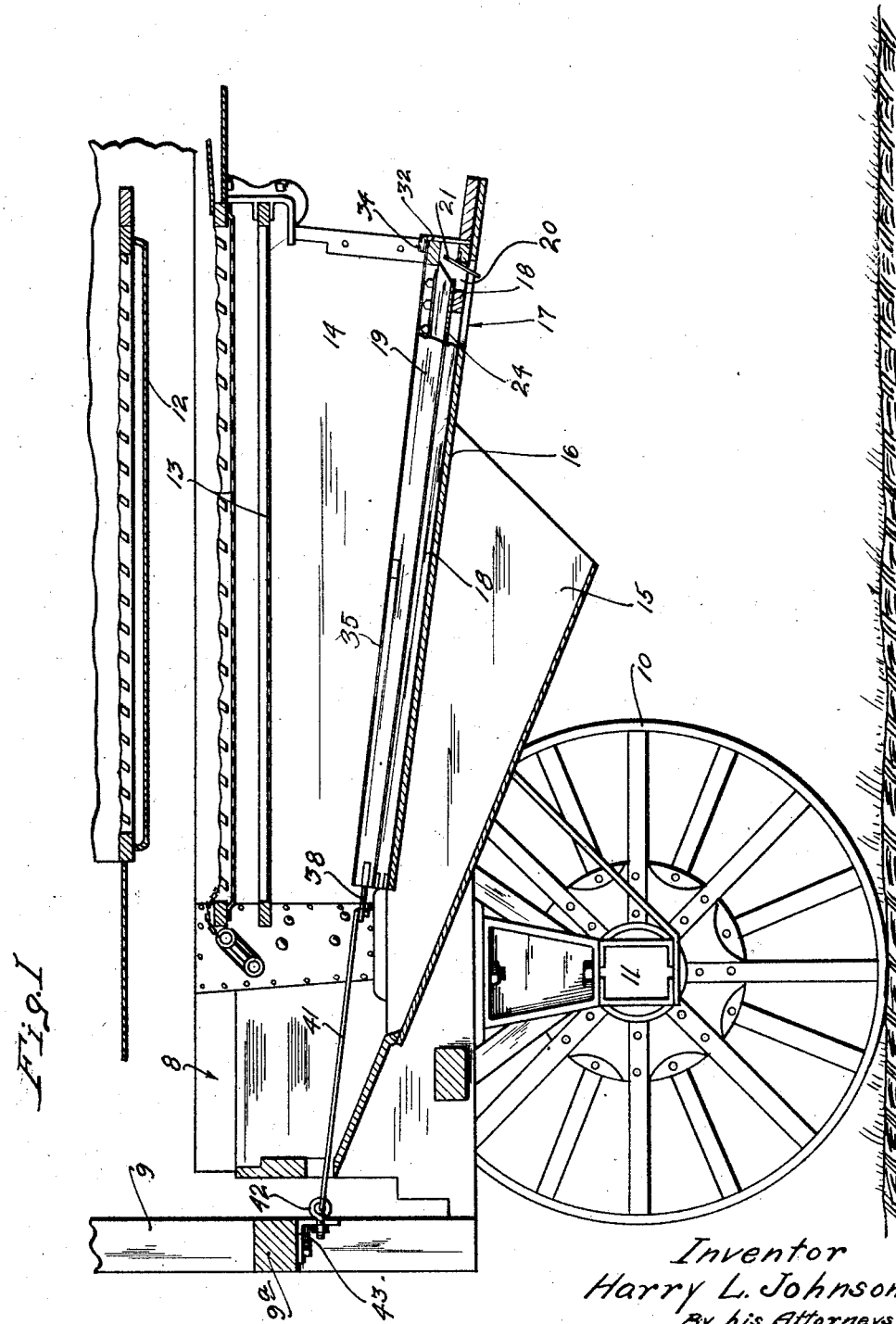
Inventor
Harry L. Johnson
By his Attorneys

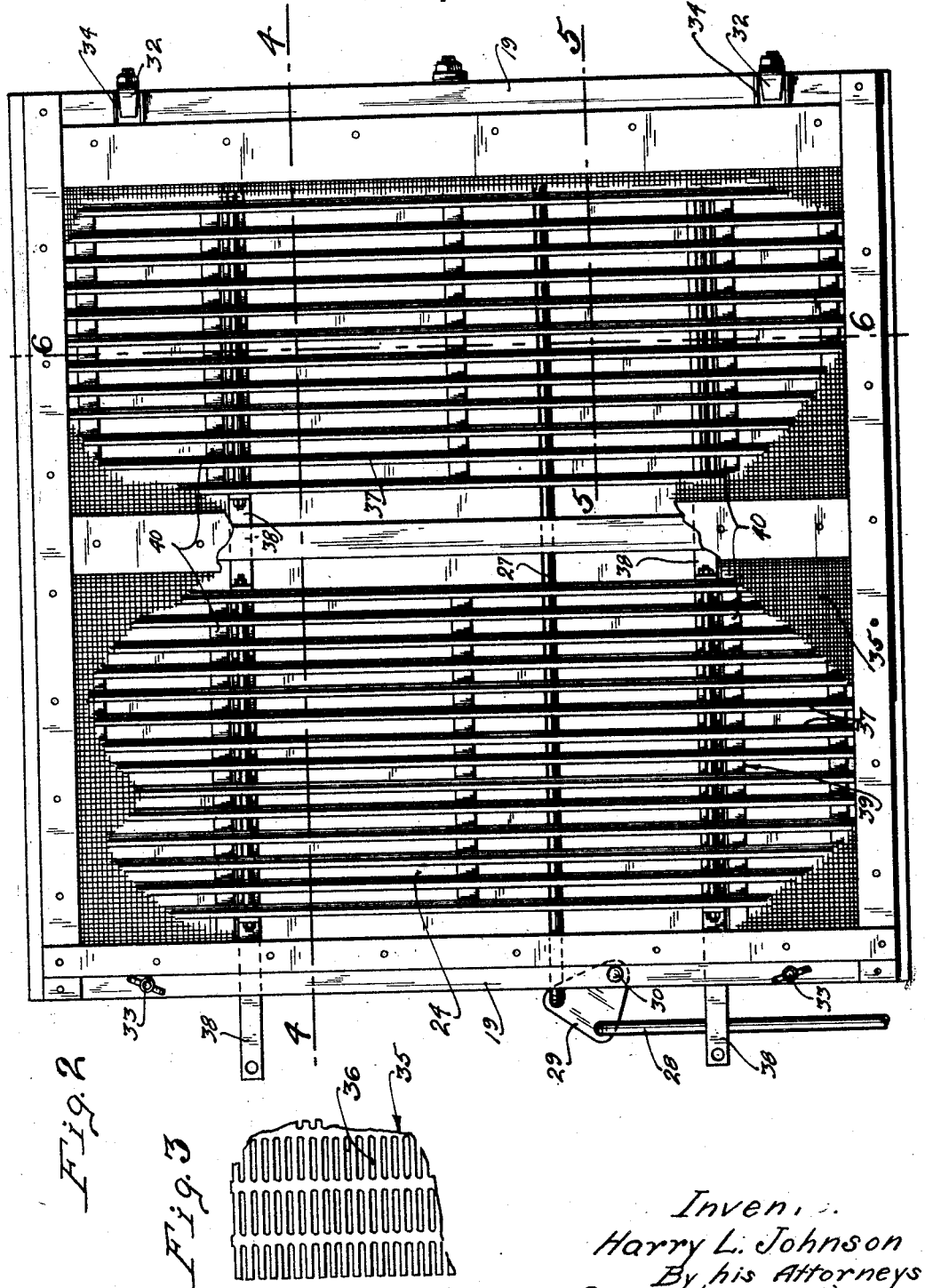

Feb. 12, 1929.
H. L. JOHNSON
CLEANING SIEVE
Filed April 8, 1926
1,701,778
4 Sheets-Sheet 3
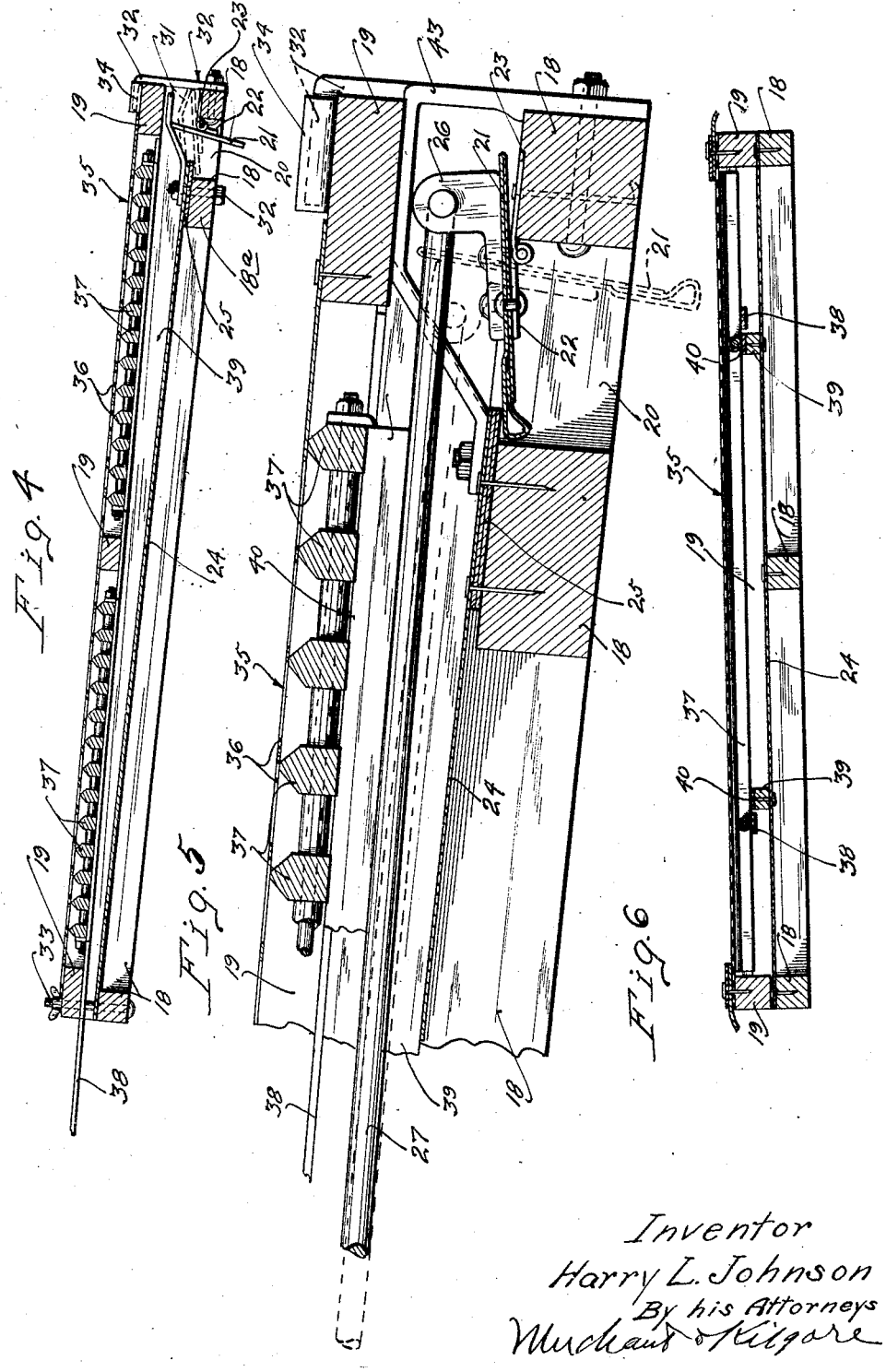
Inventor
Harry L. Johnson
By his Attorneys
Merchant & Kilgore

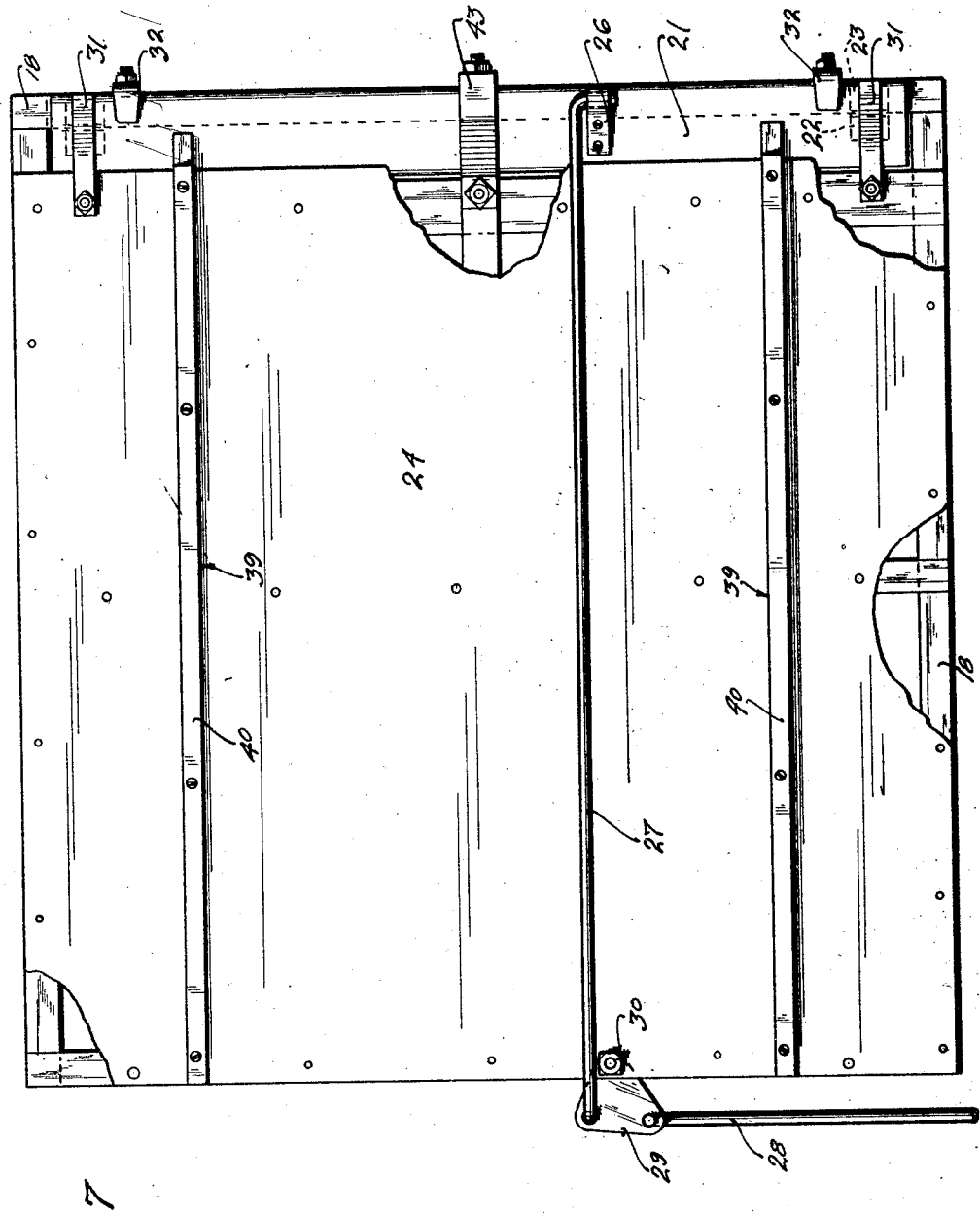

Patented Feb. 12, 1929.

1,701,778

UNITED STATES PATENT OFFICE.

HARRY L. JOHNSON, OF MINNEAPOLIS, MINNESOTA, ASSIGNOR OF ONE-HALF TO ANDRINE M. SORENSEN, OF ST. PAUL, MINNESOTA.

CLEANING SIEVE.

Application filed April 8, 1926. Serial No. 100,573.

My present invention provides an extremely simple and highly efficient recleaning sieve especially adapted for use in connection with threshing machines to separate from the good grain, such as good wheat or good oats or a mixture of the two, usually designated as "succotash", what is generally known as dockage and which dockage will usually include more or less of the following seeds: mustard, French weed, pigeon grass, buckwheat, barley, pin oats, cracked and shriveled wheat, and the like.

When this improved recleaning sieve is applied to a threshing machine, it will be arranged to receive the commingled grains that have been passed through the chaffer or scalping sieves and from which the straw, chaff, and all objects larger than wheat and oats will have been removed. The operation and purposes of this improved sieve will be more fully considered after having first described a commercial form of the sieve illustrated in the accompanying drawings, wherein like characters indicate like parts throughout the several views.

Referring to the drawings:

Fig. 1 is a vertical longitudinal section showing the improved recleaning sieve and certain of the immediately associated parts of a threshing machine, the latter being substantially of standard or well known construction, and the said parts being viewed from the left-hand side of the machine;

Fig. 2 is a plan view showing the improved recleaning sieve removed from the threshing machine;

Fig. 3 is a fragmentary plan view showing a portion of the sieve surface, which, as illustrated, is a perforated zinc sieve having long narrow passages;

Fig. 4 is a longitudinal section taken on the line 4—4 of Fig. 2;

Fig. 5 is an enlarged fragmentary section taken on the line 5—5 of Fig. 2;

Fig. 6 is a transverse section taken on the line 6—6 of Fig. 2; and

Fig. 7 is a plan view with some parts broken away, showing the sieve frame, deck and certain immediately connected parts, the sieve proper and the cleaning device therefor being removed.

In Fig. 1, certain parts of the threshing machine are shown and such parts may be briefly noted as follows: the housing 8, the frame 9, rear supporting wheels 10 mounted on the rear axle 11, the vibratory grain pan 12, the chaffer 13, the vibratory sieve shoe 14, an inclined bottom deck 15. The vibratory sieve shoe 14 is, as shown, provided with the customary imperforate inclined bottom or deck 16, which, however, is provided near its lower end with a large transverse discharge passage 17.

The improved recleaning sieve, which will now be described, is adapted for ready application to the inclined bottom 16 of the vibratory shoe 14 of the threshing machine already in use, or in new structures it may be incorporated with the vibratory shoe as an entirety and without requiring the shoe bottom or deck 16. This improved sieve structure, as illustrated and as preferably designed, is constructed as a complete self-contained structure made up of the separating screen or surface proper, a cleaning device, a bottom deck, a gate in the bottom deck, and a two-part or sectional frame, the sections of which are detachably connected, the separating sieve or surface being carried by the upper frame section and being interchangeable with other sieves of the same character but having perforations or passages of different size or character for effecting different kinds of separations. The frame sections are both rectangular structures and are indicated, respectively, by the numerals 18 and 19. The lower frame 18, at its discharge end, has longitudinally spaced transverse members that afford a large transverse discharge passage 20 that is equipped with a gate by means of which said passage 20 may be opened and closed, at will. This gate 21, as shown, is made up of a sheet metal plate folded into substantially flat form and provided on its bottom with rigidly secured hinge members 22 pivoted to hinge members 23 rigidly secured on the lower transverse bar of the frame 18. Here it is important to note that the pivotal connection between the hinge members 22 and 23 is between the front and rear edges of the gate 21, so that when the gate 21 is turned to substantially vertical open position, its major portion will drop down through the passage 20 and its minor but very considerable part will project vertically upward above the frame 18. The purpose of this arrangement will appear later on. The top of the frame 18 is covered by an imperforate plate or deck 24 preferably of thin sheet metal. The lower edge of this deck 24 extends downward and projects slightly over or into the passage 20 and, as best shown in Fig. 5, it will be noted that the deck 24 is spaced from the lower frame 18 by canvas strips 25, which form a tight joint between said deck 24 and gate 21. By reference particularly to Fig. 5, it will be noted that when the gate 21 is in its closed position shown by full lines, it underlaps the lower edge of the deck 24 and closes the passage 20.

To operate the gate 21 from one side of the threshing machine, said gate is provided with an upstanding lug 26 connected to the front end of an operating rod 27, the rear end of which is connected to a transverse hand-manipulated rod 28 by a bell crank 29 pivoted to the rear end of the frame 18 at 30, (see particularly Figs. 2 and 7). For yieldingly holding the gate 21 both in its extreme closed and open positions, according to the position in which it may be set, a leaf spring 31 is rigidly anchored at one end, as shown, by a nut-equipped bolt 32 to the cross bar 18ª of the frame 18. The spring 31 is so formed, (see particularly Fig. 4), that the gate 21 will be frictionally held in an open position shown by full lines, and when in a closed position indicated by dotted lines, will be spring-held in such position.

The upper frame 19 is detachably locked to the lower frame 18 and, preferably, this is accomplished by hook-acting brackets 32 and nut-equipped bolts 33. The brackets 32, at their lower ends, are bolted to the front bar of the frame 18 and their upper ends are bent horizontally rearward and engaged with flanged metallic seats 34 secured in the top of the front bar of the frame 19. The bolts 33 are passed through bolt holes in the rear bars of the frames 18 and 19 and, as shown, are provided with thumb nuts at their upper ends, (see Figs. 2 and 4).

Secured to the upper frame 19 and stretched over the top thereof is a sieve surface preferably in the form of a zinc plate 35 having elongated perforations 36. The actual structure of this plate is best shown in Fig. 3. By reference to Fig. 1, it will be noted that the side rails of the lower frame 18 are strips having parallel edges, while the side rails of the upper frame 19 are strips that have increasing depth from their rear toward their front ends, so that the space between the deck 24 and sieve plate 35 increases in a direction from the front toward the rear of the sieve structure and gives increased space for the swinging of the upper portion of the gate 21 when the latter is turned into an open position, as indicated by dotted lines in Fig. 5. Here it may be stated that the upper portion of the gate, when turned into open position, practically closes the passage between the upper and lower frames and positively stops the flow of seed or grain in a forward direction and deflects the same downward through the passage 20.

For cleaning the sieve plate 35, that is, for keeping its perforations clear of grain or seeds lodged therein, I provide a sieve-cleaning device comprising transverse wooden slats 37 sharpened at their upper edges and secured to parallel longitudinal thrust bars 38, which latter are preferably straight and flat iron strips. The slats 37 rest on parallel laterally spaced rails 39 secured on the top of the deck 24 and preferably provided with metallic facing strips 40. The rails 39 are of increasing depth from their front toward their rear ends and their upper surfaces are parallel to the sieve plate 35, so that the cleaning device, when moved longitudinally or when in action, will maintain contact with said sieve plate. By reference to Fig. 6, it will be noted that the thrust bars 38 work close to the rails 39 and, hence, cooperate with the latter to guide the sieve-cleaning device and to hold the same against lateral movements.

Inasmuch as the sieve frame is arranged to be vibrated longitudinally of the threshing machine, the relative movement of the cleaning device in respect to the sieve may be best produced by anchoring the sieve-cleaning device to a fixed part of the machine; and this, as shown, is accomplished by connecting the rearwardly extended ends of the thrust bars 38 by links 41 to eye-bolts or similar anchoring devices 42 which, as shown in Fig. 1, are directly applied to an angle bar 43, which, in turn, is bolted to a transverse member 9ª of the machine frame structure.

In Figs. 5 and 7, the numeral 43 indicates an intermediately located bridge bracket rigidly secured to the front portion of the lower frame 18, spanning the passage 20 and affording a rest for the intermediate portion of front bar of the upper frame 19.

*Operation.*

In the threshing operation, the chaff and the like will be carried off by the chaffer 13 and delivered to the bottom deck 15, but the commingled grain and seeds, assumed to be chiefly wheat but with various other seeds, such as generally treated as dockage, will pass through the sieves 13 and onto the sieve 35. The good wheat and good oats, if any, will not pass through the perforations of the sieve 35, but will be delivered off from the lower end of said sieve, while all of those seeds or grains that constitute dockage and such, for example, as mustard, French weed, pigeon grass, buckwheat, barley, pin oats, and cracked and shriveled wheat, will pass through the perforations 36 of the sieve 35 and onto the deck 24. When the gate 21 is turned into its open position indicated by full lines in Fig. 4 and by dotted lines in Fig. 5, such dockage will be positively intercepted by the gate and directed downward through the passage 20 and thus the dockage will be separated from the good wheat. This device does not attempt to separate good oats from good wheat, but the separation of these two grains may be readily accomplished by other and well known means. The particular purpose of this device, is to remove dockage from the good grain and this result is accomplished in a most efficient and effective way.

The lower sieve frame 18 should be quite permanently secured to the vibratory shoe 14 and the removal thereof would be a matter of very considerable inconvenience and, moreover, said lower frame 18, in some instances, will be built as a permanent part of the shoe. Frequently, removal of the dockage from the good grain in the threshing operation will not be desired; and when this action is desired, it is only necessary to move the gate 21 into its closed position shown by dotted lines in Fig. 4 and by full lines in Fig. 5, thereby causing the dockage to be recommingled with the good grain. Otherwise stated, when the gate 21 is in a closed position, the recleaning device or dockage separator will be rendered ineffective, but is kept in position ready for use as a dockage separator simply by moving the gate 21 into its open position.

As already indicated, the sieves 35 having different sizes or kinds of mesh or openings may be employed and the one can be quickly substituted for the other.

It is frequently desirable to sow commingled flax and wheat, and for the separation of these seeds, a sieve 35 having smaller mesh or openings than that used for the separation above described will be employed. In this kind of separation, the flax would be separated as dockage, but, of course, would not be treated as waste or low grade grain or seed.

What I claim is:

1. A recleaning device comprising detachably connected upper and lower rectangular frames of approximately the same contour mounted one on top of the other, the lower frame near its delivery end having spaced transverse bars or members affording a transverse discharge passage, a sieve applied to said upper frame, a deck applied to said lower frame and projecting slightly into said discharge passage to afford a gate-stopping ledge, a gate hinged to the lowermost transverse bar of said lower frame at a point between its upper and lower edges, whereby said gate will project above said deck when turned downward within said discharge passage, said gate when turned upward into a closed position stopping against the projecting ledge-forming portion of said deck.

2. A recleaning device comprising detachably connected upper and lower rectangular frames of approximately the same contour mounted one on top of the other, the lower frame near its delivery end having spaced transverse bars affording a transverse discharge passage, a sieve applied to said upper frame, a deck applied to said lower frame and projecting slightly into said discharge passage to afford a gate-stopping ledge, a gate hinged to the lowermost transverse bar of said lower frame at a point between its upper and lower edges, whereby said gate will project above said deck when turned downward within said discharge passage, said gate when turned upward into a closed position stopping against the projecting ledge-forming portion of said deck, said lower frame at its transversely intermediate portion having a rigidly secured raised bracket that spans its discharge passage and affords a support for the intermediate portion of the lower transverse member of said upper frame.

3. A recleaning device comprising detachably connected upper and lower frames, a sieve applied to said upper frame, a deck applied to said lower frame and having spaced transverse bars or members affording a discharge passage near its delivery end, a gate hinged to said lower frame and arranged to open and close the discharge passage of said deck, said gate being arranged to move above said deck when moved to open said discharge passage, a sieve cleaning device mounted on said deck and arranged to scrape the under surface of said sieve, said frames having increasing depth toward the delivery ends of the sieve and deck, whereby the sieve and deck are given increased space from the receiving toward the delivery ends and whereby, when said gate is moved to an open position it will be given increased clearance space and will afford a stop for directing material through the discharge passage of said deck, the said frames being detachable and when connected constituting a complete unit and in which sieve structure, when the said frames are separated, said sieve will remain attached to said upper frame and said deck, cleaning device and gate will remain attached to said lower frame.

4. A recleaning device comprising a sieve, a deck underlying said sieve and having spaced transverse bars or members affording a discharge passage near its delivery end and backward of the extreme delivery end of said sieve but so close thereto that all of the grain passing through said sieve will pass through the discharge passage of said deck, a gate hinged in respect to said deck and arranged to open and close the discharge passage thereof, said gate, when open, projecting above said deck and affording a stop plate for directing the material through said discharge passage, and a gate-operating connection including a yielding device arranged to hold said gate in open or closed position, according to the position in which it is set, but adapted to yield under pressure applied to said gate-operating connection.

5. A recleaning device comprising detachably connected upper and lower frames, a sieve applied to said upper frame, a deck applied to said lower frame and having spaced transverse bars or members affording a discharge passage near its delivery end, a gate hinged to said lower frame and arranged to open and close the discharge passage of said deck, a sieve-cleaning device supported by said deck and having slats arranged to scrape the under surface of said sieve, said gate being hinged between its edges so that when moved into an open position it will project above said deck, a spring operating on the upper edge of said gate to yieldingly hold the same in both open and closed positions according to the position in which it may be set, and an operating rod pivotally connected to said gate and extending in the space between said deck and sieve.

6. A recleaning device comprising detachably connected upper and lower frames, a sieve applied to said upper frame, a deck applied to said lower frame and having spaced transverse bars or members affording a discharge passage, a gate hinged to said lower frame and arranged to open and close the discharge passage of said deck, and when turned into an open position serving as a stop plate to direct the material through said discharge passage, said deck, on its upper surface, having longitudinal rails, and a sieve-cleaning device having transverse sieve-engaging slats arranged to slide on the rails of said deck and having cleats that engage the sides of said rails to guide said sieve-cleaning device in the sieve-cleaning action.

In testimony whereof I affix my signature.

HARRY L. JOHNSON.